UNITED STATES PATENT OFFICE.

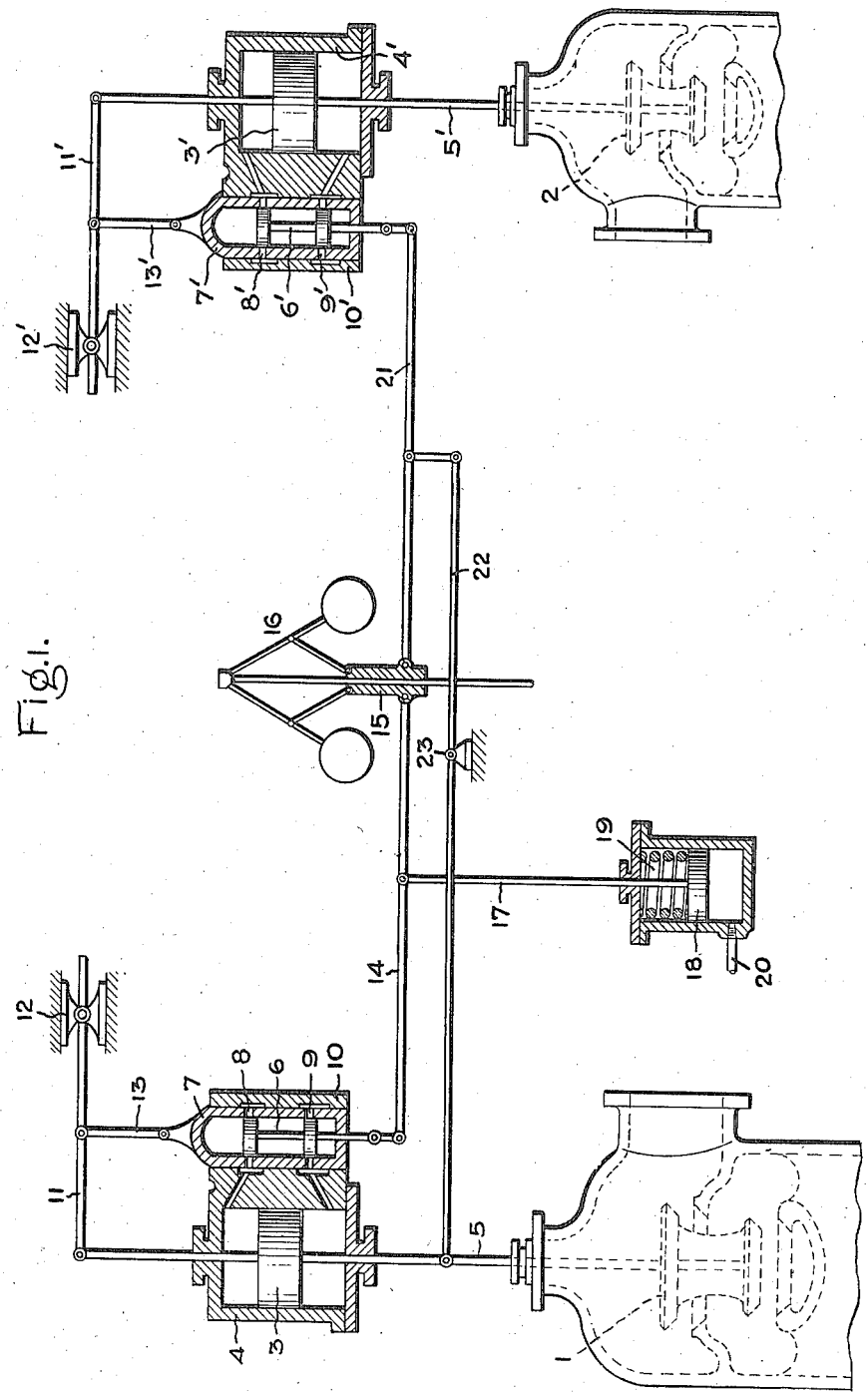

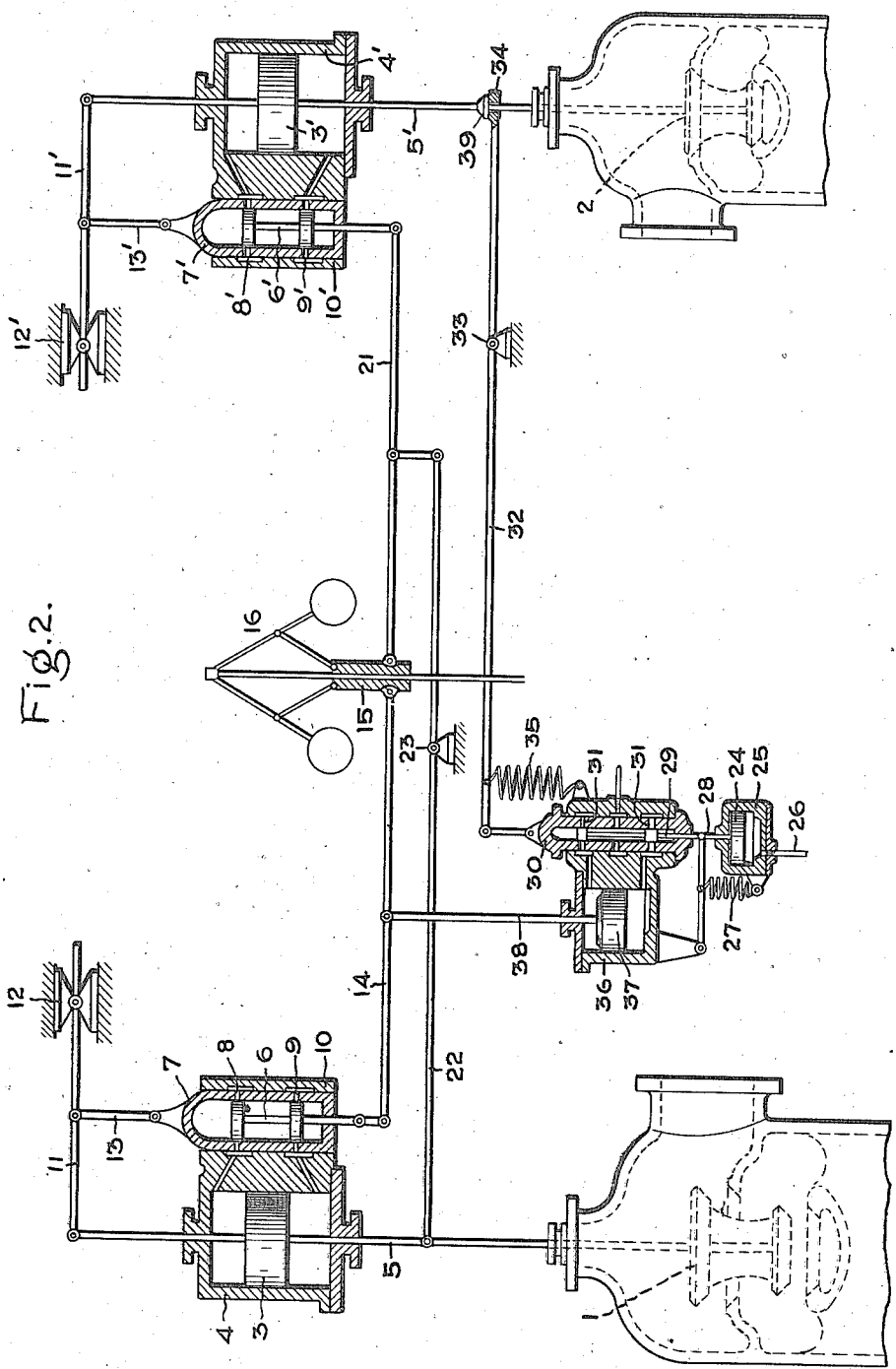

WILHELM PAPE, OF CHARLOTTENBURG, GERMANY, ASSIGNOR TO GENERAL ELECTRIC COMPANY, A CORPORATION OF NEW YORK.

REGULATOR FOR MIXED-PRESSURE TURBINES.

1,092,948.

Specification of Letters Patent. Patented Apr. 14, 1914.

Application filed January 21, 1913. Serial No. 743,334.

*To all whom it may concern:*

Be it known that I, WILHELM PAPE, a subject of the King of Prussia, residing at Charlottenburg, Germany, have invented certain new and useful Improvements in Regulators for Mixed-Pressure Turbines, of which the following is a specification.

This invention relates to elastic-fluid turbines, and more especially to those in which the motive fluid employed is primarily low pressure steam supplied from a high pressure engine, or from industrial systems of heating, cooking and the like. In such installations, however, it is customary to provide some means for supplementing the low pressure steam with steam at boiler pressure in case the supply of low pressure fluid becomes inadequate to carry the load.

My invention has to do with such an installation commonly termed a mixed pressure turbine, and its object is to afford a simple system of valves and levers by means of which the steam from the two sources will be automatically supplied to the turbine in such quantities as may be necessary to meet the varying conditions of service. The regulating members are arranged to be acted on not only by a speed governor but also by a pressure-responsive device.

A perfectly working mixed pressure regulator must fulfil the following conditions: First, upon variations of load the speed governor must first move only the low pressure valve, and when this has reached its final position must influence also the high pressure valve. Second, at any desired position of the low pressure valve, the high pressure valve must be adapted to operate directly in case of further action by the speed governor. If the low pressure valve is held in any desired position, either by mechanical means or by the influence of the pressure-responsive device, then the process of regulation on the high pressure side must be capable of being associated with the regulating process for the low pressure side. Third, when any influence is exerted by the pressure-responsive device, the two valves must be moved in opposite directions in such manner that the load on the machine as a whole and therewith the number of revolutions will remain constant. Fourth, means must be provided for hand regulation of the pilot valves in the valve-actuating motors, while the machine is running, in order to permit the two sides to operate properly. Fifth, the pressure-responsive device must be able to influence the low pressure valve without acting upon the high pressure valve. Sixth, if the low pressure valve is entirely open and there is sufficient low pressure steam, then if an overload occurs, the speed governor must be able to open the high pressure valve without acting on the pressure-responsive device, since otherwise the ratio of synchronism of the governor would be strongly affected. All these conditions are provided for in the construction forming the subject-matter of the present application. By the addition of a single connecting rod between two valve systems, the high pressure and the low pressure, a very simple and compact arrangement of a mixed pressure regulator has been secured.

The invention is shown diagrammatically in the accompanying drawing wherein—

Figure 1 shows one form which my invention may take, and Fig. 2 shows the second form thereof.

The low pressure valve 1 and the high pressure valve 2 are provided with identical actuating motors, comprising a piston 3, 3' working in a cylinder 4, 4' and attached to the stem 5, 5' of its respective valve. The pilot valve 6, 6' which controls the admission of hydraulic pressure to said cylinder is a double piston valve, as shown, and works in a sleeve 7, 7' containing the ports 8, 8', 9, 9', said sleeve being slidable lengthwise in the valve chest 10, 10'. A lever 11, 11' is pivoted to the upper end of the valve stem 5, 5' and is fulcrumed on a block 12, 12' which can be moved longitudinally of said lever, so as to vary the effective length of the same. Between said block and the stem is pivoted a link 13, 13' which is connected to the sleeve 7, 7'. The pilot valve 6 of the low pressure valve is connected to a lever 14 which is pivoted at its other end to the movable collar 15 of a speed governor 16. At some intermediate point a rod 17 is pivoted to said lever and conveys thereto the movements of a pressure-responsive device, consisting of a movable abutment 18 biased in one direction by a spring 19 and exposed on its opposite side to the pressure of the low pressure steam, conveyed through a pipe 20. The pilot valve 6' of the high pressure valve motor is connected to a lever 21 pivoted at its other end to the collar 15 of the speed governor. At some intermediate point is connected one end of a long lever 22, fulcrumed at 23 and connected at its other end to the stem 5 of the low pressure valve. The lever 14 is fulcrumed on the upper end of the stem 17, while the lever 21 is fulcrumed on the end of the long lever 22.

It will be observed that both pilot valves are connected to the speed governor, so that both tend to move simultaneously in the same direction. The lever 22, however, prevents this, and compels them to operate in series. For example, if the load increases the balls of the speed governor drop and the collar 15 pushes down the adjacent ends of the levers 14 and 21 and these in turn push up the pilot valves 6, 6′. Hydraulic pressure flows to the under side of the piston 3 attached to the low pressure valve and opens said valve farther to admit more steam to the engine. But this movement of the stem 5 of said valve operates the lever 22, which acts to pull down the pilot valve 6′ of the high pressure valve motor and bring it back to its mid-position, so that the opening of the high pressure valve is prevented. This operation is repeated until the piston 3 and its stem 5 have reached their highest positions, that is to say, when the low pressure valve is wide open. In this situation, any further dropping of the balls of the speed governor will actuate the levers 14, 21 as before, but the lever 22 will not be actuated because the stem 5 will remain at rest. The shifting of the pilot valve 6′ will then be effective to cause its motor to operate and admit steam through the high pressure valve.

In the operation of each valve, the upward movement of the stem 5, 5′ lifts the lever 11, 11′ and thereby slides the sleeve 7, 7′ upward until its ports are again closed by the pilot valve and the movement of the piston 3, 3′ is arrested. In other words, the levers 11, 11′ and the sleeves constitute follow-up devices for preventing an over-travel of the valve. The adjustable fulcrum blocks 12, 12′ permit such an adjustment of these follow-up devices that the movement of the high pressure valve can be adapted exactly to that of the low pressure valve without in any way influencing the ratio of lever transmission between the speed governor and the pilot valves.

The chamber below the abutment 18 is in communication with the source of low pressure steam and said abutment is connected with the lever 14 which actuates the pilot valve 6. If, for any reason, the pressure of the low pressure steam falls, so that the amount of such steam is no longer sufficient to maintain the normal speed of the turbine, then the spring 19 will force the abutment downward, and in so doing it will pull down the lever 14 and the pilot valve 6, which admits hydraulic pressure above the piston 3 and effects a downward movement of the stem 5. This operates through the long lever 22 to push up the pilot valve 6′ and admit pressure below the piston 3′, so that the ultimate effect is to admit high pressure steam to the turbine to make up for the loss of low pressure steam. This change from low to high pressure steam is effected positively and quite independently of the speed of the engine, so that at constant load, no variation in the number of revolutions can occur by reason of a drop in the supply of low pressure steam. Moreover, the partial closing of the low pressure valve, which happens when the stem 5 moves downwardly, as explained above, operates to keep up the pressure of such low pressure steam as is available. It appears, therefore, that the simple addition of the long lever 22 in the manner shown and described, enables the two otherwise similar valve-actuating motors to perform the various functions and meet the various conditions above set forth.

The modification shown in Fig. 2 is intended to meet certain objectionable conditions which have been found to arise in operation when the low pressure steam is supplied to the turbine from an accumulator. The steam entering the accumulator at intervals and in large amounts from the reciprocating engines or other sources, causes a sudden rise of pressure ahead of the throttle valve, and simultaneously also in the pressure-responsive device. The latter therefore instantly moves into its extreme position and thus causes the low pressure valve to be entirely opened. The engine thereupon speeds up until the speed governor closes the steam valve so far that the quantity of steam flowing through it corresponds to the load on the engine. This varying steam pressure therefore causes a constant over-regulation and corresponding irregularity in speed. If the mixed pressure unit is connected in parallel with other units, it will, according to the newly-established speed, either furnish work to the unit running in parallel with it, or take work therefrom, which of course is contrary to good operation. The modification is designed to obviate these difficulties. It will be observed that the transference of movement of the pressure-responsive device to the system of levers is effected indirectly through the operation of an auxiliary regulating device.

The movable abutment or piston 24 working in the cylinder 25 is urged upwardly by the pressure of the steam in the accumulator conveyed to said cylinder through the pipe 26. A tension spring 27 acts against this pressure. The rod 28 attached to the piston operates the pilot valve 29 in a sliding casing or sleeve 30, which contains ports 31 and is connected to a lever 32 fulcrumed at 33 and carrying an eye 34 loosely encircling the stem 5' of the high pressure valve 2. A tension spring 35 urges said sleeve to its lowest position when said lever is free to move. The pilot valve 29 controls the admission of hydraulic pressure to the cylinder 36 in which is a piston 37 whose rod 38 is pivotally attached to the lever 14 at its fulcrum point. From this construction it follows that a comparatively small pressure difference in the accumulator causes when necessary a complete opening or complete closure of the low pressure valve 1, since there is no follow-up device to return the pilot valve to a mid-position. The sleeve 30 may be shifted by the same amount as the length of the stroke which the pressure-responsive device is adapted to make when the pressure in the accumulator rises. The movement of the sleeve is dependent upon the movement of the high pressure valve 2. If this is closed, as shown in the drawing, the stop 39 on the stem 5 acting through the lever 32 lifts the sleeve to its extreme upper position. The stroke of the piston 24 is so calculated that the pilot valve 29 closes the ports in the sleeve in this upper position, when the piston 24 has reached its uppermost limit. In this condition of affairs the pressure-responsive device is incapable of effecting the opening of the low pressure valve 1 at the highest pressure in the accumulator. But when the accumulator pressure falls, the pilot valve opens the ports in the sleeve, so that the low pressure valve 1 will close to such a point that the normal pressure is reestablished in the accumulator. If, on the contrary, as for example in the case of the simultaneous supply of low pressure and high pressure steam to the turbine, the high pressure valve 2 is also open to the desired amount, the spring 35 pulls the sleeve into its lowest position, because the stop 39 has released the lever 32. Since this condition assumes a lower pressure of accumulator steam, the piston 24 will be at some intermediate point in the sleeve cylinder, so that the pilot valve 29 can either rise or fall with the varying accumulator pressure and either open or close the low pressure valve 1 as the case may require. With a rising pressure in the accumulator the valve 1 is opened until, by the operation of the long lever 22 the high pressure valve 2 becomes closed. This movement of the stem 5' operates through the lever 32 to lift the sleeve, and thus prevent the pressure-responsive device from acting in case of further rise of accumulator pressure. The low pressure valve can now be opened wider, if necessary, only by the action of the speed governor.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is—

1. In a mixed pressure turbine, the combination with a high pressure valve and a low pressure valve, of motors for operating said valves, a pilot valve for each motor, a lever connected to each pilot valve, a speed governor for operating said levers simultaneously, and a long lever connected to the stem of the low pressure valve and pivotally attached to and acting as the fulcrum of the lever operating the pilot valve of the high pressure valve motor.

2. In a mixed pressure turbine, the combination with a high pressure valve and a low pressure valve, of motors for operating said valves, a pilot valve for each motor, a long lever attached at one end to the stem of the low pressure valve, a pressure-responsive device, a speed governor, and levers pivotally attached to said governor and to the pilot valves, one of said levers being fulcrumed on the end of the long lever and the other on the pressure-responsive device.

3. In a mixed pressure turbine, the combination with a high pressure valve and a low pressure valve, of motors for operating said valves, a speed governor, a system of levers connecting both said motors to said governor, a motor connected to said system of levers for affecting the low pressure valve motor, a pressure responsive device controlling said last named motor, and means controlled by the high pressure valve for rendering said last named motor unresponsive to any increase in pressure when the high pressure valve is closed.

4. In a mixed pressure turbine, the combination with a high pressure valve and a low pressure valve, of motors for operating said valves, a pilot valve for each motor, a lever connected to each pilot valve, a speed governor for operating said levers simultaneously, a long lever connected to the stem of the low pressure valve and pivotally attached to the lever operating the pilot valve of the high pressure valve, a pressure responsive device connected to the governor operated lever of the low pressure valve, and means for rendering said pressure responsive device unresponsive to any increase of pressure when the high pressure valve is closed.

5. In a mixed pressure turbine, the combination with a high pressure valve and a low pressure valve, of motors for operating said valves, a pilot valve for each motor, a long lever attached at one end to the stem of the low pressure valve, a pressure responsive device, a speed governor, levers pivotally attached to said governor and to the pilot valves, one of said levers being fulcrumed on the end of the long lever and the other on the pressure responsive device, and means for rendering said pressure responsive device unresponsive to any increase in pressure when the high pressure valve is closed.

6. In a mixed pressure turbine, the combination with a high pressure valve and a low pressure valve, of motors for operating said valves, a speed governor, a pressure-responsive device, a system of levers connecting these two elements with the motors, a pilot valve controlled by the pressure-responsive device and admitting hydraulic pressure to a cylinder containing a piston connected to the low pressure valve motor, a slidable sleeve containing ports coöperating with said pilot valve, and means for shifting said sleeve controlled by the movement of the high pressure valve.

7. In a mixed pressure turbine, the combination with a high pressure valve and a low pressure valve, of motors for operating said valves, a system of levers for controlling said motors, a motor connected to one of said levers, a pilot valve for said last named motor, a pressure-responsive device for actuating said pilot valve, a sliding sleeve containing ports coöperating with said pilot valve, and a lever connected at one end to said sleeve and having its other end in the path of a stop on the high pressure valve.

In witness whereof, I have hereunto set my hand this thirty-first day of December, 1912.

WILHELM PAPE.

Witnesses:
    HENRY HASPER,
    WOLDEMAR HAUPT.